US012739787B2

(12) United States Patent
Hong

(10) Patent No.: US 12,739,787 B2
(45) Date of Patent: Sep. 15, 2026

(54) METHOD AND APPARATUS FOR IMPLEMENTING PAGING CAUSE INDICATION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 330 days.

(21) Appl. No.: 18/574,455

(22) PCT Filed: Jun. 29, 2021

(86) PCT No.: PCT/CN2021/103310
§ 371 (c)(1),
(2) Date: Dec. 27, 2023

(87) PCT Pub. No.: WO2023/272535
PCT Pub. Date: Jan. 5, 2023

(65) Prior Publication Data
US 2024/0340850 A1 Oct. 10, 2024

(51) Int. Cl.
*H04W 68/00* (2009.01)
*H04W 68/02* (2009.01)

(52) U.S. Cl.
CPC ......... *H04W 68/005* (2013.01); *H04W 68/02* (2013.01)

(58) Field of Classification Search
CPC ........ H04W 8/24; H04W 60/04; H04W 68/00; H04W 68/005; H04W 68/02
See application file for complete search history.

(56) References Cited

U.S. PATENT DOCUMENTS

2020/0344719 A1 10/2020 Luo et al.
2022/0330202 A1* 10/2022 Kumar .................. H04W 60/00
2022/0346060 A1* 10/2022 Kumar ................ H04W 68/005
2022/0361132 A1* 11/2022 Gurumoorthy ..... H04W 60/005
2023/0362884 A1* 11/2023 Ke ...................... H04W 68/005
2024/0031981 A1* 1/2024 Bao ..................... H04W 68/005

FOREIGN PATENT DOCUMENTS

CN 110324893 A 10/2019
CN 111836219 A 10/2020
WO WO 2018082598 A1 5/2018
WO WO 2021066562 A1 4/2021

OTHER PUBLICATIONS

Vivo et al. "Introduction of MUSIM capability exchange" 3GPP TSG-WG SA2 Meeting #145E, S2-2103987, May 2021, 29 pages.
European Patent Application No. 21947490.5, Search and Opinion dated Feb. 28, 2025, 9 pages.
PCT/CN2021/103310 International Search Report dated Mar. 11, 2022, 2 pages.
Indian Patent Application No. 202447005146, Office Action dated Feb. 5, 2026, 11 pages.

* cited by examiner

*Primary Examiner* — Frank Duong
(74) *Attorney, Agent, or Firm* — Cozen O'Connor

(57) ABSTRACT

A method for realizing a paging cause indication is performed by a terminal device and includes sending a first indication message to a core network device. The first indication message is used for indicating whether the terminal device supports the paging cause indication.

20 Claims, 7 Drawing Sheets send a first indication message to a core network device, the first indication message is used for indicating whether the terminal device supports a paging cause indication

S21 receive a first indication message sent by the terminal device, the first indication message is used for indicating whether the terminal device supports the paging cause indication

S101 send a second indication message to the terminal device and/or the access network device, the second indication message is used for indicating whether the core network device supports the paging cause indication

S102 send target indication information to an access network device after determining that the terminal device supports the paging cause indication

S103

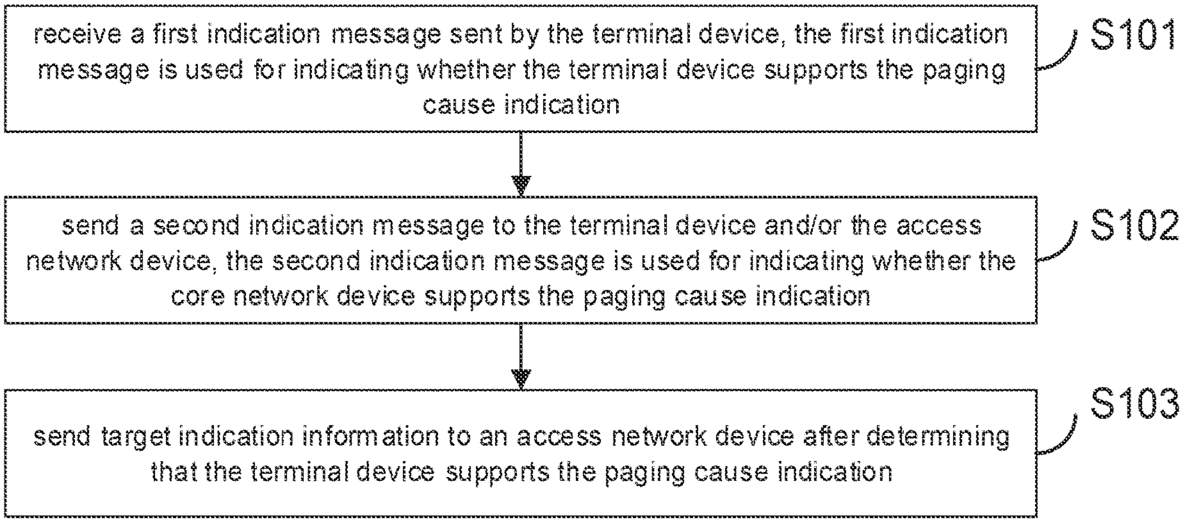

FIG. 10 send a second indication message to the terminal device and/or the access network device, the second indication message is used for indicating whether the core network device supports the paging cause indication

S111

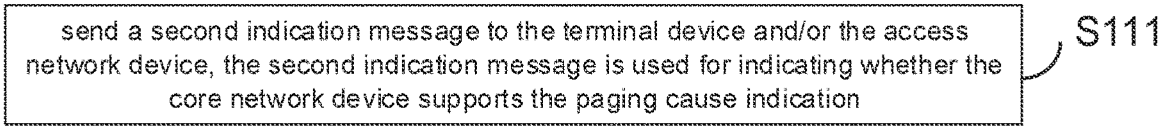

FIG. 11 send a context configuration-related request of the terminal device to the access network device through an X2 interface or a NG interface, the context configuration-related request carries the target indication information

S121

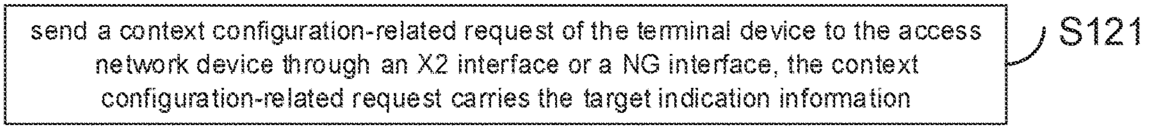

FIG. 12

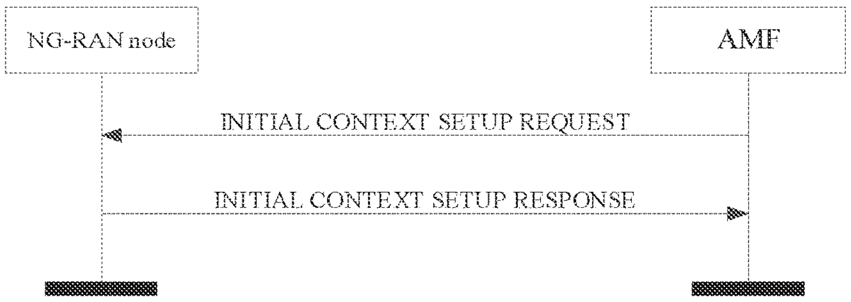

FIG. 13

METHOD AND APPARATUS FOR IMPLEMENTING PAGING CAUSE INDICATION

CROSS-REFERENCE TO RELATED APPLICATION

This application is a national phase of International Application No. PCT/CN2021/103310 filed on Jun. 29, 2021, the content of which is hereby incorporated by reference in its entirety.

TECHNICAL FIELD

The disclosure relates to a field of wireless communication technologies, in particular to a method for realizing a paging cause indication and an apparatus thereof.

BACKGROUND

In the related art, a terminal device may have a plurality of Global Systems for Mobile Communications (GSMs) at the same time. When the GSMs of the terminal device receive a paging message, the terminal device needs to decide whether to respond to the paging.

SUMMARY

In a first aspect, embodiments of the disclosure provide a method for realizing a paging cause indication, performed by a terminal device. The method includes:

- sending a first indication message to a core network device, in which the first indication message is configured to indicate whether the terminal device supports a paging cause indication.

In a second aspect, embodiments of the disclosure provide another method for realizing paging cause indication, performed by a core network device. The method includes:

- determining that a terminal device supports the paging cause indication and sending target indication information to an access network device, in which the target indication information is configured to indicate that the terminal device supports the paging cause indication.

In a third aspect, embodiments of the disclosure provide another method for realizing a paging cause indication, performed by an access network device. The method includes:

- receiving target indication information sent by a core network device, in which the target indication information is configured to indicate whether a terminal device supports a paging cause indication; and
- sending a paging cause to the terminal device, in response to paging the terminal device and the target indication information indicating that the terminal device supports the paging cause indication.

BRIEF DESCRIPTION OF THE DRAWINGS

In order to clearly illustrate technical solutions of embodiments of the disclosure or background technologies, a description of drawings used in embodiments or the background technologies is given below.

FIG. 10 is a flowchart illustrating a method for realizing a paging cause indication according to an embodiment of the disclosure.

FIG. 11 is a flowchart illustrating a method for realizing a paging cause indication according to an embodiment of the disclosure.

FIG. 12 is a flowchart illustrating a method for realizing a paging cause indication according to an embodiment of the disclosure.

FIG. 13 is a schematic diagram illustrating a method for realizing a paging cause indication according to an embodiment of the disclosure.

DETAILED DESCRIPTION

For ease of understanding, the terms involved in this disclosure are introduced at first.

1. New Radio (NR)

The NR network is a global 5th Generation (5G) mobile communication technology standard based on Orthogonal Frequency Division Multiplexing (OFDM) technology and a NR design, which is a very important cellular mobile technology foundation for the next generation of the 5G. 5G technology will achieve the characteristics of ultra-low latency and high reliability. NR involves a new OFDM-based wireless standard. OFDM refers to a digital multi-carrier modulation method. This standard was adopted by the 3rd Generation Partnership Project (3GPP), and the term NR has thereafter been used and became another name for 5G.

2. Universal Mobile Telecommunications System (UMTS)

The UMTS not only defines a radio interface, but also a complete technology standard of The 3rd Generation (3G) Mobile Communications.

3. Evolution UMTS Terrestrial Radio Access Network (E-UTRAN)

In 3G networks, the access network portion is called UMTS Terrestrial Radio Access Network (UTRAN). In Long Term Evolution (LTE) networks, based on the evolution relation, the access network portion is called E-UTRAN, which is a mobile communication radio network in LTE.

4. Tracking Area Update (TAU)

The TAU refers to applying the corresponding location area concept to the systems of User Equipment (UE), E-UTRAN and Evolved Packet Core (EPC). The location area is called TA. For UEs in the idle state and in the connected state, the EPC manages its registered TAs, and the UE also changes the registration information in the EPC when its TAs change. TAU can inform the EPC of the available UEs.

In order to well understand the method for realizing a paging cause indication according to embodiments of the disclosure, a communication system to which embodiments of the disclosure are applicable is first described below.

Figure 1:
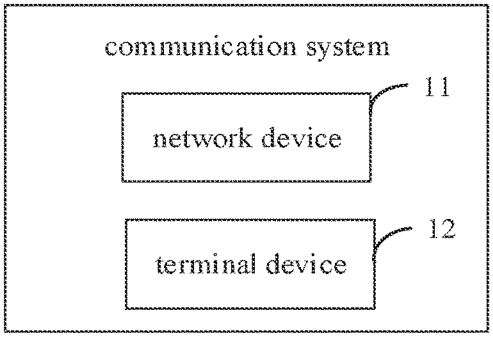
FIG. 1 is a structural diagram illustrating a communication system according to embodiment of the disclosure.

As illustrated in FIG. 1, FIG. 1 is a structural diagram illustrating a communication system according to an embodiment of the disclosure. The communication system may include, but is not limited to, a network device and a terminal device. The number and form of devices shown in FIG. 1 are only for examples and do not constitute a limitation on embodiments of the disclosure, and two or more network devices and two or more terminal devices may be included in practical applications. The communication system shown in FIG. 1 includes, for example, a network device 11 and a terminal device 12.

It should be noted that the technical solutions of embodiments of the disclosure can be used in various communication systems, such as, a LTE system, a 5G mobile communication system, a 5G NR system, or other future new mobile communication systems. It is noted that the side link in embodiments of the disclosure may also be referred to as sidelink or direct link.

The network device 11 in embodiments of the disclosure is an entity on a network side for transmitting or receiving signals. For example, the network device 11 may be an access network device. The access network device may be an evolved NodeB (eNB), a transmission reception point (TRP), a next generation NodeB (gNB) in a NR system, a base station in other future mobile communication systems, or an access node in a wireless fidelity (WiFi) system. The network device 11 may be a core network device. In embodiments of the disclosure, the core network device may be a device in communication with an access network device. The core network device may be a 5G core network device, such as an Access and Mobility Management Function (AMF), or an EPC device, for example, Mobility Management Entity (MME). The specific technology and specific device form adopted by the network device are not limited in embodiments of the disclosure. The network device according to embodiments of the disclosure may be composed of a central unit (CU) and a distributed unit (DU). The CU may also be called a control unit. The use of CU-DU structure allows a protocol layer of the network device, such as a base station, to be split, some functions of the protocol layer are placed in the CU for centralized control, and some or all of the remaining functions of the protocol layer are distributed in the DU, which is intensively controlled by the CU.

The terminal device 12 in embodiments of the disclosure is an entity on a user side for receiving or transmitting signals, such as a cellular phone. The terminal device may also be referred to as a terminal, a UE, a mobile station (MS), a mobile terminal (MT), and the like. The terminal device can be a vehicle with communication functions, a smart vehicle, a mobile phone, a wearable device, a Pad, a computer with wireless transceiver functions, a virtual reality (VR) terminal device, an augmented reality (AR) terminal device, a wireless terminal device in industrial control, a wireless terminal device in self-driving, a wireless terminal device in remote medical surgery, a wireless terminal device in smart grid, a wireless terminal device in transportation safety, a wireless terminal device in smart city, a wireless terminal device in smart home, etc. The specific technology and specific device form adopted by the terminal device are not limited in embodiments of the disclosure.

It is understood that the communication system described in embodiments of the disclosure is intended to more clearly illustrate the technical solutions of embodiments of the disclosure, and does not constitute a limitation on the technical solutions according to embodiments of the disclosure. It is understood by those skilled in the art that as the system architecture evolves and new business scenarios emerge, the technical solutions according to embodiments of the disclosure are also applicable to similar technical problems.

The method and the apparatus for realizing a paging cause indication according to the disclosure will be introduced in detail below with reference to the accompanying drawings.

Figure 2:
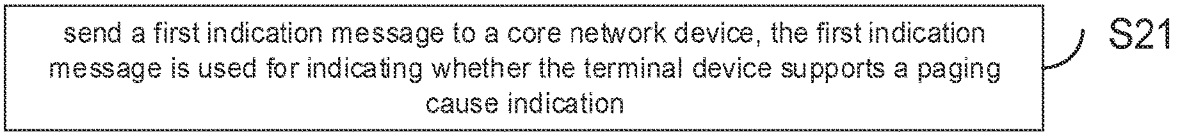
FIG. 2 is a flowchart illustrating a method for realizing a paging cause indication performed by a terminal device according to an embodiment of the disclosure.

FIG. 2 is a flowchart illustrating a method for realizing a paging cause indication according to an embodiment of the disclosure. As illustrated in FIG. 2, the method is performed by a terminal device. The method includes but is not limited to the following.

At step S21, a first indication message is sent to a core network device, in which the first indication message is used for indicating whether the terminal device supports a paging cause indication.

In embodiments of the disclosure, the first indication message is used for indicating whether the terminal device supports the paging cause indication. In some implementations, the terminal device supports the paging cause indication. In some implementations, the terminal device does not support the paging cause indication. For example, the system authority of the terminal device does not support the paging cause indication, or the user configures that the terminal device does not support the paging cause indication. The signaling used by the terminal device for sending the first indication message is different depending on different supporting conditions for the paging cause indication.

It should be noted that the core network device may be a core network device that supports 4G/5G. Different types of communication networks correspond to different core network devices. For example, when the communication network is a new radio (NR) network, the core network device may be an AMF, and when the communication network is an Evolution Universal Mobile Telecommunications System (UMTS) Terrestrial Radio Access Network (E-UTRAN), the core network device may be a Mobility Management Entity (MME).

Figure 3:
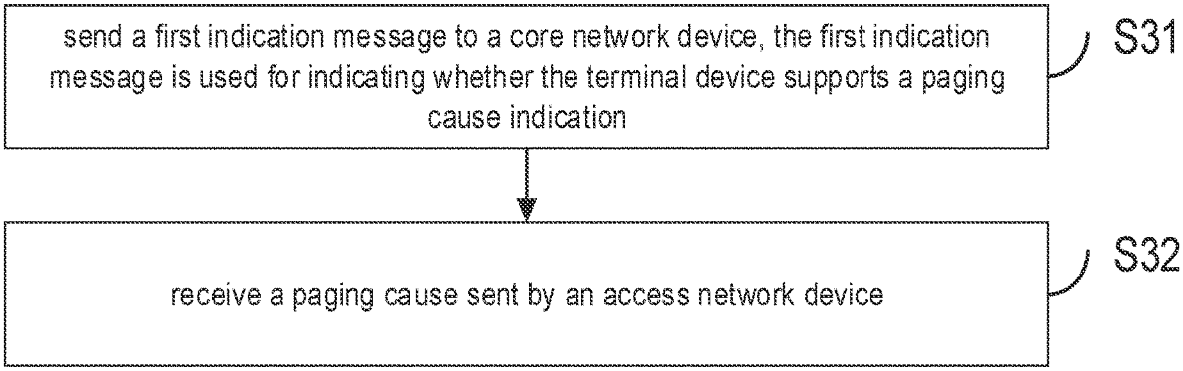
FIG. 3 is a flowchart illustrating a method for realizing a paging cause indication according to an embodiment of the disclosure.

With the method for realizing the paging cause indication according to embodiments of the disclosure, the first indication message is sent to the core network device, in which the first indication message is used for indicating whether the terminal device supports the paging cause indication, and further a paging cause sent by the access network device is received. By implementing embodiments of the disclosure, the indication of the paging cause may be realized, thereby avoiding the waste of paging resources and improving the paging efficiency. FIG. 3 is a flowchart illustrating a method for realizing a paging cause indication according to an embodiment of the disclosure. As illustrated in FIG. 3, the method is performed by a terminal device. The method includes but is not limited to the following.

At step S31, a first indication message is sent to a core network device, in which the first indication message is used for indicating whether the terminal device supports the paging cause indication.

The description of step S31 can be referred to the relevant contents of above embodiments and will not be repeated here.

At step S32, a paging cause sent by an access network device is received.

The access network device may send the paging cause to the terminal device after the access network device determines that the terminal device supports the paging cause indication. Correspondingly, the terminal device may receive the paging cause sent by the access network device. As a possible implementation, the terminal device may send the first indication message to the core network device. The first indication message is used for determining whether the terminal device supports the paging cause indication. In some implementations, the first indication message indicates that the terminal device does not support the paging cause indication, and the access network device is unable to realize, based on the paging cause, the indication of the paging cause to the terminal device. In some implementations, in response to the terminal device supporting the paging cause indication, the indication of the paging cause may be realized. That is, the access network device may send the paging cause to the terminal device when the terminal device supports the paging cause indication, thereby realizing the indication of the paging cause.

With the method for realizing a paging cause indication according to embodiments of the disclosure, the first indication message is sent to the core network device, in which the first indication message is used for indicating whether the terminal device supports the paging cause indication, and further the paging cause sent by the access network device is received. By implementing embodiments of the disclosure, the indication of the paging cause may be realized, thereby avoiding the waste of paging resources and improving the paging efficiency.

Figure 4:
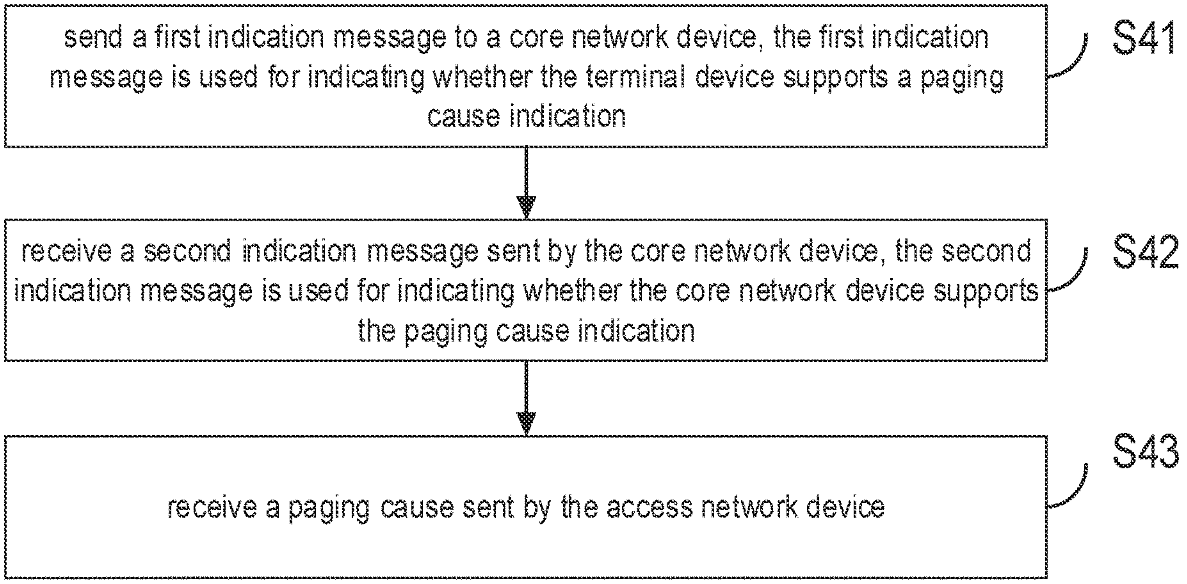
FIG. 4 is a flowchart illustrating a method for realizing a paging cause indication according to an embodiment of the disclosure.

FIG. 4 is a flowchart illustrating a method for realizing a paging cause indication according to an embodiment of the disclosure. The method is performed by a terminal device. As illustrated in FIG. 4, the method includes the following.

At step S41, a first indication message is sent to a core network device, in which the first indication message is used for indicating whether the terminal device supports the paging cause indication.

The description of step S41 can be referred to the relevant contents of above embodiments and will not be repeated here.

At step S42, a second indication message sent by the core network device is received, in which the second indication message is used for indicating whether the core network device supports the paging cause indication.

In a possible implementation, the second indication message is sent by the core network device after determining, based on the first indication message, that the terminal device supports the paging cause indication.

In order to improve the accuracy, in embodiments of the disclosure, it is further determined whether the core network device supports the paging cause indication after determining that the terminal device supports the paging cause indication. That is, the core network device sends, to the terminal device, an indication message for indicating whether the core network device supports the paging cause indication.

In some examples, when the network accessed by the terminal is different, the signaling used to receive the second indication message is different. In some implementations, the terminal device receives the second indication message through a registration accept signaling in response to the network accessed by the terminal device being a NR network. In some implementations, the terminal device receives the second indication message through an attach accept signaling or a tracking area update (TAU) accept signaling in response to the network accessed by the terminal device being an E-UTRAN.

At step S43, a paging cause sent by the access network device is received.

The description of step S43 can be referred to the relevant contents of above embodiments and will not be repeated here.

With the method for realizing a paging cause indication according to embodiments of the disclosure, the second indication message sent by the core network device is received, in which the second indication message is used for indicating whether the core network device supports the paging cause indication and the second indication message is sent by the core network device after determining, based on the first indication message, that the terminal device supports the paging cause indication. By implementing embodiments of the disclosure, the indication of the paging cause can be realized, thereby avoiding the waste of paging resources and improving the paging efficiency.

Figure 5:
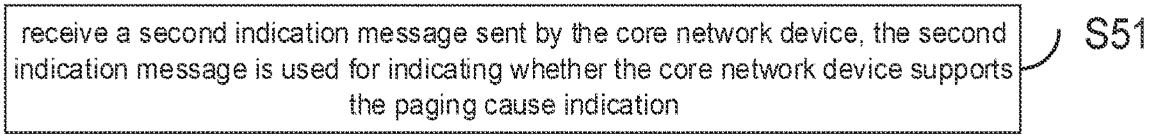
FIG. 5 is a flowchart illustrating a method for realizing a paging cause indication according to an embodiment of the disclosure.

FIG. 5 is a flowchart illustrating a method for realizing a paging cause indication according to an embodiment of the disclosure. As illustrated in FIG. 5, the method is performed by a terminal device. The method includes but is not limited to the following.

At step S51, a second indication message sent by the core network device is received, in which the second indication message is used for indicating whether the core network device supports the paging cause indication.

In a possible implementation, the second indication message is sent by the core network device after determining, based on the first indication message, that the terminal device supports the paging cause indication.

In order to improve the accuracy, in embodiments of the disclosure, it is further determined whether the core network devices supports the paging cause indication after determining that the terminal device supports the paging cause indication. That is, the core network device sends, to the terminal device, an indication message for indicating whether the core network device supports the paging cause indication.

In some examples, when the network accessed by the terminal is different, the signaling used to receive the second indication message is different. In some implementations, the terminal device receives the second indication message through a registration accept signaling in response to the network accessed by the terminal device being a NR network. In some implementations, the terminal device receives the second indication message through an attach accept signaling or a TAU accept signaling in response to the network accessed by the terminal device being an E-UTRAN.

By implementing embodiments of the disclosure, the indication of the paging cause may be realized, thereby avoiding the waste of paging resources and improving the paging efficiency.

Figure 6:
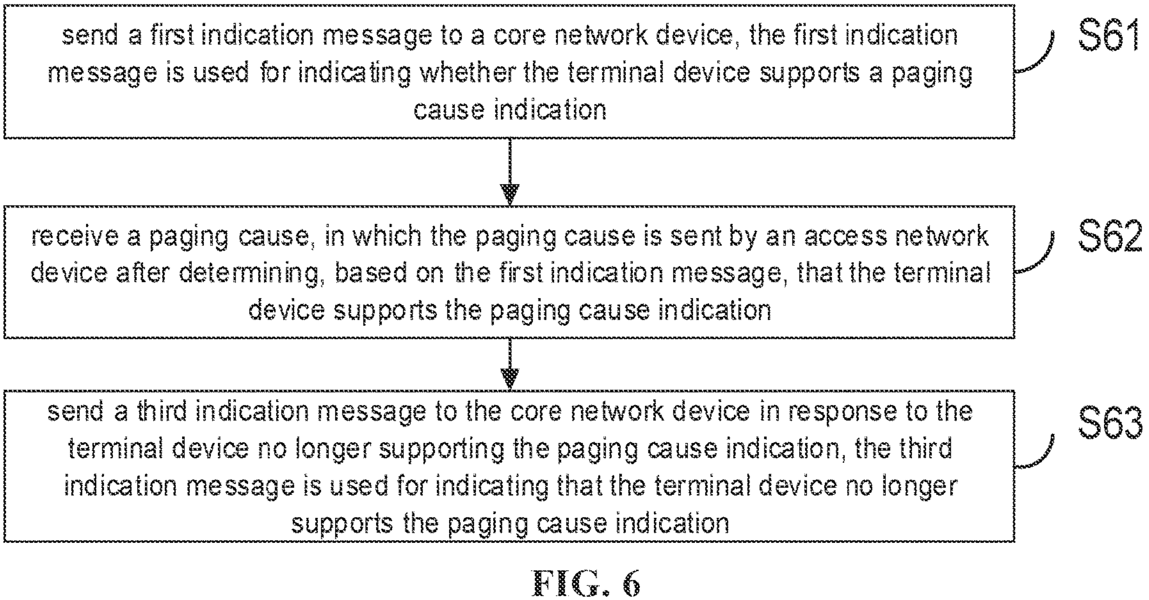
FIG. 6 is a flowchart illustrating a method for realizing a paging cause indication according to an embodiment of the disclosure.

FIG. 6 is a flowchart illustrating a method for realizing a paging cause indication according to an embodiment of the disclosure. The method is performed by a terminal device. As illustrated in FIG. 6, the method includes the following.

At step S61, a first indication message is sent to a core network device, in which the first indication message is used for indicating whether the terminal device supports the paging cause indication.

At step S62, a paging cause sent by an access network device is received, in which the paging cause is sent by an access network device after determining, based on the first indication message, that the terminal device supports the paging cause indication.

The detailed descriptions of steps S61-S62 can be referred to the relevant contents of above embodiments and will not be repeated here.

At step S63, a third indication message is sent to the core network device in response to the terminal device no longer supporting the paging cause indication, in which the third indication message is used for indicating that the terminal device no longer supports the paging cause indication.

The first indication message may be used for determining whether the terminal device supports the paging cause indication. In some implementations, the first indication message indicates that the terminal device does not support the paging cause indication, so that it is unable to realize the indication of the paging cause based on the paging cause. The terminal device sends the third indication message to the core network device, in which the third indication message is used for indicating that the terminal device no longer supports the paging cause indication. In some examples, the signaling used for reporting the first indication message to the core network device may be determined based on the network type of the network accessed by the terminal device.

With the method for realizing a paging cause indication according to embodiments of the disclosure, the third indication message is sent to the core network device in response to the terminal device no longer supporting the paging cause indication, in which the third indication message is used for indicating that the terminal device no longer supports the paging cause indication. By implementing embodiments of the disclosure, the indication of the paging cause may be realized, thereby avoiding the waste of paging resources and improving the paging efficiency.

Figure 7:
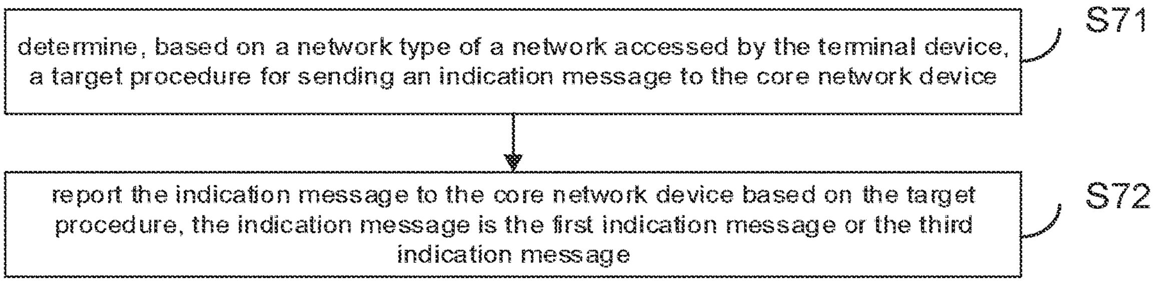
FIG. 7 is a flowchart illustrating a method for realizing a paging cause indication according to an embodiment of the disclosure.

FIG. 7 is a flowchart illustrating a method for realizing a paging cause indication according to an embodiment of the disclosure. The method is performed by a terminal device. As illustrated in FIG. 7, the method includes the following.

At step S71, a target procedure for sending an indication message to the core network device is determined based on a network type of the network accessed by the terminal device.

In embodiments of the disclosure, the signaling for reporting the indication message to the core network device is different depending on the network type of the network accessed by the terminal device. By determining, based on the network type of the network accessed by the terminal device, the target procedure for sending the indication message to the core network device, the determination, based on the target procedure, of a corresponding signaling to report the indication message to the core network device is facilitated.

In some implementations, it is determined that the target procedure is one of: a registration procedure, a registration area management (RAM) procedure or a mobile registration update (MRU) procedure in response to the network accessed by the terminal device being the NR network.

In some implementations, it is determined that the target procedure is one of: an attach procedure or a TAU procedure in response to the network accessed by the terminal device being the E-UTRAN.

At step S72, the indication message is reported to the core network device based on the target procedure, in which the indication message is the first indication message or the third indication message.

In some implementations, the indication message is reported to the core network device through a registration request signaling in response to the accessed network being the NR network and the target procedure being the registration procedure, the RAM procedure or the MRU procedure.

When sending the first indication message to the core network device, the method includes the following.

In some implementations, the first indication message is sent to the core network device through an attach request signaling in response to the accessed network being the E-UTRAN and the target procedure being the attach procedure.

In some implementations, the first indication message is reported to the core network device through a TAU request signaling in response to the accessed network being the E-UTRAN and the target procedure being the TAU procedure.

In embodiments of the disclosure, after sending the first indication message to the core network device, when the first indication message indicates that the terminal device supports the paging cause indication, the terminal device may receive the paging cause sent by the access network device when paging the terminal device.

When sending the third indication message to the core network device, the method includes the following.

In some implementations, the third indication message is reported to the core network device through a registration request signaling in response to the accessed network being the NR network and the target procedure being the registration procedure, the RAM procedure or the MRU procedure.

In some implementations, the third indication message is reported to the core network device through an attach request signaling in response to the accessed network being the E-UTRAN and the target procedure being the attach procedure.

In some implementations, the third indication message is reported to the core network device through a TAU request signaling in response to the accessed network being the E-UTRAN and the target procedure being the TAU procedure.

With the method for realizing a paging cause indication according to embodiments of the disclosure, the target procedure for sending the indication message to the core network device is determined based on the network type of the network accessed by the terminal device. The indication message is reported to the core network device based on the target procedure, in which the indication message is the first indication message or the third indication message. By implementing embodiments of the disclosure, the indication of the paging cause may be realized, thereby avoiding the waste of paging resources and improving the paging efficiency.

Figure 8:
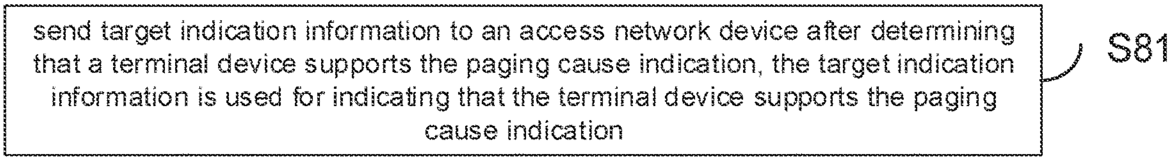
FIG. 8 is a flowchart illustrating a method for realizing a paging cause indication performed by a core network device according to an embodiment of the disclosure.

FIG. 8 is a flowchart illustrating a method for realizing to indicate a paging cause according to an embodiment of the disclosure. The method is performed by a core network device. As illustrated in FIG. 8, the method includes the following.

At step S81, it is determined that a terminal device supports a paging cause indication and target indication information is sent to an access network device, in which the target indication information is used for indicating that the terminal device supports the paging cause indication.

In some examples, it may be determined, based on a first indication message sent by the terminal device, whether the terminal device supports the paging cause indication. In response to the terminal device supporting the paging cause indication, the core network device sends the target indication information to the access network device, in which the target indication information is used for indicating whether the terminal device supports the paging cause indication. Correspondingly, after the access network device receives the target indication information, when the target indication information indicates that the terminal device supports the paging cause indication, the access network device sends the paging cause to the terminal device when the terminal device is paged.

With the method for realizing the paging cause indication according to embodiments of the disclosure, it is determined that the terminal device supports the paging cause indication and the target indication information is sent to the access network device. By implementing embodiments of the disclosure, the indication of the paging cause can be realized, thereby avoiding the waste of paging resources and improving the paging efficiency.

Figure 9:
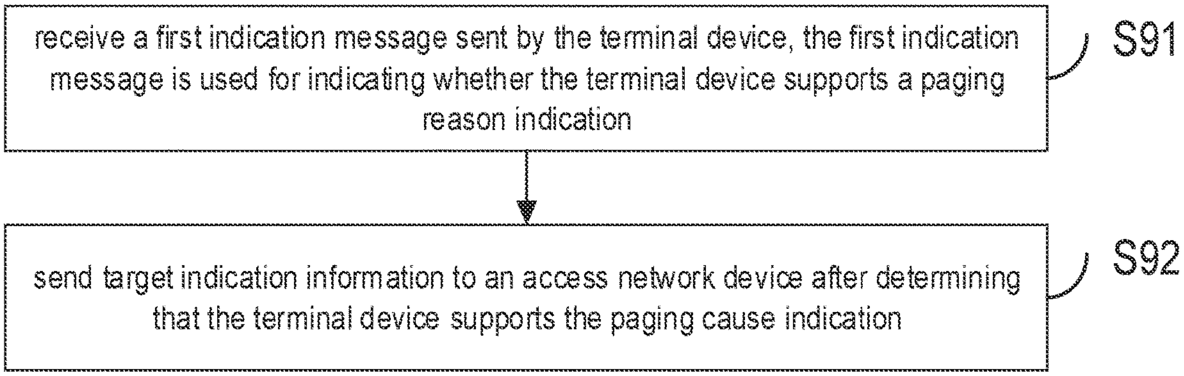
FIG. 9 is a flowchart illustrating a method for realizing a paging cause indication according to an embodiment of the disclosure.

FIG. 9 is a flowchart illustrating a method for realizing a paging cause indication according to an embodiment of the disclosure. The method is performed by a core network device. As illustrated in FIG. 9, the method includes the following.

At step S91, a first indication message sent by the terminal device is received, in which the first indication message is used for indicating whether the terminal device supports the paging cause indication.

In some implementations, the terminal device supports the paging cause indication. In some implementations, the terminal device does not support the paging cause indication. For example, the system authority of the terminal device does not support the paging cause indication, or the user configures that the terminal device does not support the paging cause indication. The signaling used by the terminal device to send the first indication message is different depending on different supporting conditions for the paging cause indication.

At step S92, it is determined that the terminal device supports the paging cause indication and target indication information is sent to an access network device.

The detailed description of step S92 can be referred to the relevant contents of above embodiments and will not be repeated here.

With the method for realizing a paging cause indication according to the embodiment of the disclosure, the first indication message sent by the terminal device is received, in which the first indication message is used for indicating whether the terminal device supports the paging cause indication. By implementing embodiments of the disclosure, the indication of the paging cause may be realized, thereby avoiding the waste of paging resources and improving the paging efficiency.

FIG. 10 is a flowchart illustrating a method for realizing a paging cause indication according to an embodiment of the disclosure. The method is performed by a core network device. As illustrated in FIG. 10, the method includes the following.

At step S101, a first indication message sent by the terminal device is received, in which the first indication message is used for indicating whether the terminal device supports the paging cause indication.

The detailed description of step S101 can be referred to the relevant contents of above embodiments and will not be repeated here.

At step S102, a second indication message is sent to the terminal device and/or the access network device, in which the second indication message is used for indicating whether the core network device supports the paging cause indication.

In some examples, before sending the second indication message to the terminal device and/or the access network device, the second indication message is sent to the terminal device when the core network device supports the paging cause indication. In some examples, the second indication message is sent to the terminal device when both the terminal device and the core network device support the paging cause indication.

In some implementations, the core network device may send the second indication message to the terminal device through a registration accept signaling in response to the network accessed by the terminal device being a NR network.

In some implementations, the core network device may send the second indication message to the terminal device through an attach accept signaling or a TAU accept signaling in response to the network accessed by the terminal device being an E-UTRAN.

In some examples, when the core network device supports the paging cause indication, the second indication message is sent to the access network device. In some examples, when both the terminal device and the core network device support the paging cause indication, the second indication message is sent to the access network device.

In some examples, when the core network device supports the paging cause indication, the second indication message is sent to the access network device and the terminal device. In some examples, when both the terminal device and the core network device support the paging cause indication, the second indication message is sent to the terminal device and the access network device.

In some examples, the method includes: sending the second indication message to each access network device connected to the core network device; or sending the second indication message to each access network device within a range of a tracking area (TA) or registration area (RA) where the terminal device is located; or sending the second indication message to an access network device accessed by the terminal device.

In some implementations, when sending the second indication message to the access network device, a target interface for sending the second indication message is determined based on the network type of the network accessed by the terminal device, and the second indication message is sent to the access network device through the target interface.

In some examples, the target interface is determined as a NG interface in response to the accessed network being the NR network, and the first core network update configuration information is sent to the access network device through the NG interface. The first core network update configuration information carries the second indication message. In some examples, the first core network update configuration message includes an AMF configuration update information (CONFIGURATION UPDATE) or NG setup response information (SETUP RESPONSE).

In some examples, the target interface is determined as a S1 interface in response to the accessed network being the E-UTRAN, and the second core network update configuration information is sent to the access network device through the S1 interface. The second core network update configuration information carries the second indication message. In some examples, the second core network update configuration information includes MME configuration update information (CONFIGURATION UPDATE) or S1 setup response information (SETUP RESPONSE).

At step S103, it is determined that the terminal device supports the paging cause indication and the target indication information is sent to an access network device.

The detailed description of step S103 can be referred to the relevant contents of above embodiments and will not be repeated here.

With the method for realizing the paging cause indication according to embodiments of the disclosure, the indication of the paging cause may be realized, thereby avoiding the waste of paging resources and improving the paging efficiency.

FIG. 11 is a flowchart illustrating a method for realizing a paging cause indication according to an embodiment of the disclosure. The method is performed by a core network device. As illustrated in FIG. 11, the method includes but is not limited to the following.

At step S111, a second indication message is sent to the terminal device and/or the access network device, in which the second indication message is used for indicating whether the core network device supports the paging cause indication.

In some examples, the second indication message is sent to the terminal device when the core network device supports the paging cause indication. In some examples, when both the terminal device and the core network device support the paging cause indication, the second indication message is sent to the terminal device.

In some examples, the second indication message is sent to the access network device when the core network device supports the paging cause indication. In some examples, when both the terminal device and the core network device support the paging cause indication, the second indication message is sent to the access network device.

In some examples, when the core network device supports the paging cause indication, the second indication message is sent to the access network device and the terminal device. In some examples, when both the terminal device and the core network device support the paging cause indication, the second indication message is sent to the access network device and the terminal device.

In some examples, the method includes: sending the second indication message to each access network device connected to the core network device; or sending the second indication message to each access network device within a range of TA or RA where the terminal device is located; or sending the second indication message to an access network device accessed by the terminal device.

In some implementations, when sending the second indication message to the access network device, the target interface for sending the second indication message is determined based on the network type of the network accessed by the terminal device, and the second indication message is sent to the access network device through the target interface. Specific implementations can be referred to the relevant contents of above embodiments and will not be repeated herein.

FIG. 12 is a flowchart illustrating a method for realizing a paging cause indication according to an embodiment of the disclosure. The method is performed by a core network device. As illustrated in FIG. 12, the method includes the following.

At step S121, a context configuration-related request of the terminal device is sent to the access network device through an X2 interface or a NG interface, in which the context configuration-related request carries the target indication information.

The core network device may send a specific configuration request of the terminal device to the access network device through the X2 interface or the NG interface, and send the target indication information to the access network device based on the specific configuration request. The target indication information may indicate to the access network device whether the terminal device supports the paging cause indication.

In some examples, the specific configuration request of the terminal device may be a context configuration-related request of the terminal device. The context configuration-related request of the terminal device carries the target indication information.

For example, the context configuration-related request of the terminal device may include: an initial context setup request of the terminal device (INITIAL CONTEXT SETUP REQUEST) and/or a context modification request of the terminal device (UE CONTEXT MODIFICATION REQUEST).

Figure 14:
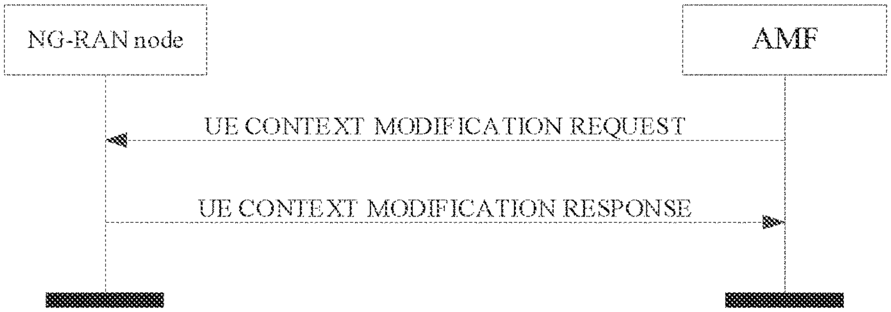
FIG. 14 is a schematic diagram illustrating a method for realizing a paging cause indication according to an embodiment of the disclosure.

As illustrated in FIG. 13, for example, the network accessed by the terminal device is the NR network, the core network device is the AMF, and the access network device is the NG-RAN node. The AMF sends the INITIAL CONTEXT SETUP REQUEST to the NG-RAN node through the X2 interface or the NG interface. The INITIAL CONTEXT SETUP REQUEST carries the target indication information. The NG-RAN node may feed an INITIAL CONTEXT SETUP RESPONSE back to the AMF after receiving the INITIAL CONTEXT SETUP REQUEST. As illustrated in FIG. 14, the network accessed by the terminal device is the NR network, the core network device is the AMF, and the access network device is the NG-RAN node. The AMF sends a UE CONTEXT MODIFICATION REQUEST to the NG-RAN node through the X2 interface or the NG interface. The UE CONTEXT MODIFICATION REQUEST carries the target indication information. The NG-RAN node may feed the UE CONTEXT MODIFICATION RESPONSE back to the AMF after receiving the UE CONTEXT MODIFICATION REQUEST.

In some implementations, when the user modifies the system setup so that the terminal device no longer supports the paging cause indication, the core network device receives the third indication message sent by the terminal device. The third indication message is used for indicating that the terminal device no longer supports the paging cause indication. The process of sending the third indication message from the terminal device to the core network device can be referred to the relevant contents of above embodiments and will not be repeated herein.

With the method for realizing a paging cause indication according to embodiments of the disclosure, the indication of the paging cause may be realized, thereby avoiding the waste of paging resources and improving the paging efficiency.

Figure 15:
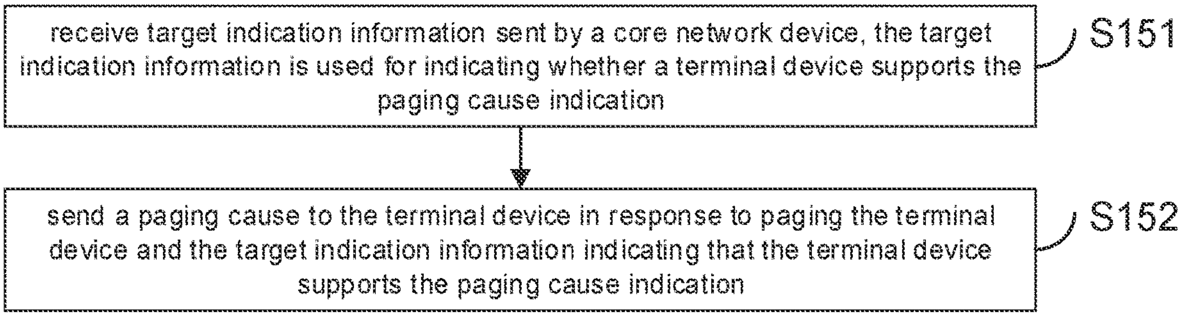
FIG. 15 is a flowchart illustrating a method for realizing a paging cause indication performed by an access network device according to an embodiment of the disclosure.

FIG. 15 is a flowchart illustrating a method for realizing a paging cause indication according to an embodiment of the disclosure. The method is performed by an access network device. As illustrated in FIG. 15, the method includes the following.

At step S151, target indication information sent by a core network device is received, in which the target indication information is used for indicating whether a terminal device supports a paging cause indication.

As a possible implementation, the core network device may send a specific configuration request of the terminal device to the access network device through an X2 interface or a NG interface, and send the target indication information to the access network device based on the specific configuration request. The target indication information may indicate to the access network device whether the terminal device supports the paging cause indication.

In some example, the specific configuration request of the terminal device may be a context configuration-related request of the terminal device. The context configuration-related request of the terminal device carries the target indication information.

For example, the context configuration-related request of the terminal device may include: an initial context setup request of the terminal device (INITIAL CONTEXT SETUP REQUEST) and/or a context modification request of the terminal device (UE CONTEXT MODIFICATION REQUEST).

That is to say, the access network device receives, through the X2 interface or the NG interface, the context configuration-related request of the terminal device sent by the core network device, and the context configuration-related request of the terminal device carries the target indication information.

The process of sending the target indication information can be referred to the relevant contents of above embodiments, and the steps will not be repeated herein.

At step S152, a paging cause is sent to the terminal device in response to paging the terminal device and the target indication information indicating that the terminal device supports the paging cause indication.

The access network device may train the terminal device. When the target indication information of the terminal device that is paged indicates that the terminal device supports the paging cause indication, the access network device may send the paging cause to the terminal device. For example, the paging cause may include voice service, download service, video service, or the like.

With the method for realizing a paging cause indication according to embodiments of the disclosure, the access network device determines, based on the target indication information, that the terminal device that is paged supports the paging cause indication, and then the terminal device sends the paging cause. By implementing the method for realizing the paging cause indication according to embodiments of the disclosure, the indication of the paging cause may be realized, thereby avoiding the waste of paging resources and improving the paging efficiency.

As a possible implementation, when sending the paging cause to the terminal device, the access network device also needs to determine a radio resource control (RRC) status of the terminal device and sends, based on the RRC status, the paging cause to the terminal device. In some examples, the access network device sends the paging cause in a radio access network (RAN) paging message in response to the RRC status of the terminal device being a RRC inactive status.

The access network device sends the paging cause in a paging message in response to the RRC status of the terminal device being a RRC idle status.

As a possible implementation, when the core network device determines that both the terminal device and/or the core network device support the paging cause indication, the core network device may send the second indication message to the terminal device and/or the access network device. The second indication message is used for indicating whether the core network device supports the paging cause indication. Correspondingly, the access network device may receive the second indication message sent by the core network device.

In some implementations, when the network type of the network accessed by the terminal device is different, the target interface through which the core network device sends the second indication message to the access network device may be different. For example, the target interface may be a NG interface or a S1 interface.

In some examples, it is determined that the target interface is the NG interface when the network accessed by the terminal device is a NR network, and the core network device sends the first core network update configuration information to the access network device through the NG interface. The first core network update configuration information carries the second indication message. That is, the access network receives the first core network update configuration information through the NG interface and obtains the second indication message from the first core network update configuration information.

In some examples, the first core network update configuration information includes AMF configuration update information (CONFIGURATION UPDATE) or NG setup response information (SETUP RESPONSE).

In some examples, it is determined that the target interface is the S1 interface when the network accessed by the terminal device is an E-UTRAN, and the core network device sends the second core network update configuration information to the access network device through the S1 interface. The second core network update configuration information carries the second indication message. That is, the access network receives the second core network update configuration information through the S1 interface and obtains the second indication message from the second core network update configuration information.

In some examples, the second core network update configuration information includes MME configuration update information (CONFIGURATION UPDATE) or S1 setup response information (SETUP RESPONSE).

As a possible implementation, the access network device receives the target indication information, stores the target indication information in the context of the terminal device. When the terminal device is paged, the access network device obtains the target indication information from the context of the terminal device by querying. When the target indication information obtained indicates that the terminal device supports the paging cause indication, the paging cause is sent to the terminal device.

Figure 16:
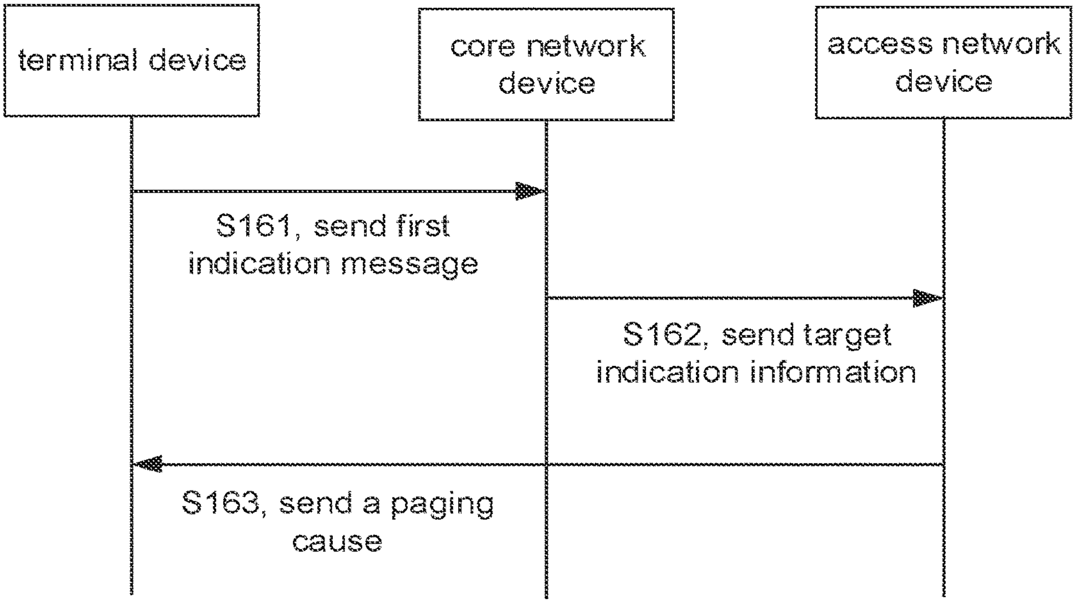
FIG. 16 is a flowchart illustrating a method for realizing a paging cause indication according to an embodiment of the disclosure.

FIG. 16 is a flowchart illustrating a method for realizing a paging cause indication according to an embodiment of the disclosure. As illustrated in FIG. 16, the method includes the following.

At step S161, a terminal device sends a first indication message to a core network device, in which the first indication message is configured to indicate whether the terminal device supports the paging cause indication.

At step S162, the core network device sends the target indication information to an access network device, in which the target indication information is used for indicating whether the terminal device supports the paging cause indication.

At step S163, the access network device sends a paging cause to the terminal device, in which the paging cause is sent by the access network device after determining, based on the target indication information, that the terminal device supports the paging cause indication.

In embodiments of the disclosure, the contents of step S161, step S162, and step S163 can be referred to the relevant contents of above embodiments and will not be repeated here.

By implementing the method for realizing a paging cause indication according to embodiments of the disclosure, the indication of the paging cause may be realized, thereby avoiding the waste of paging resources and improving the paging efficiency.

Figure 17:
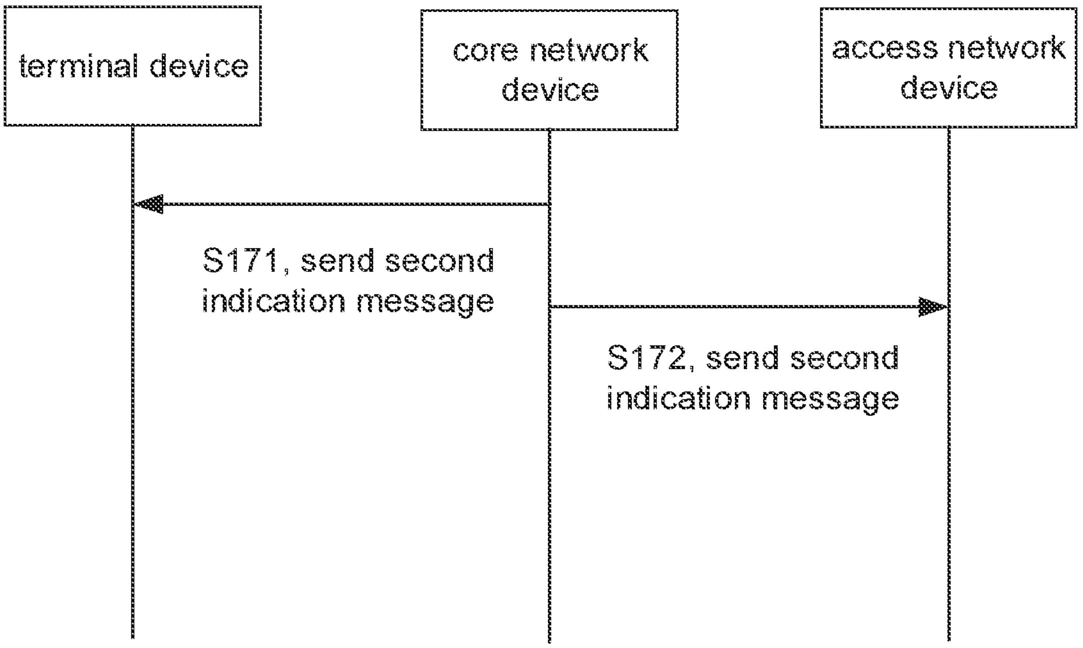
FIG. 17 is a flowchart illustrating a method for realizing a paging cause indication according to an embodiment of the disclosure.

FIG. 17 is a flowchart illustrating a method for realizing a paging cause indication according to an embodiment of the disclosure. As illustrated in FIG. 17, the method includes the following.

At step S171, a core network device sends a second indication message to a terminal device.

At step S172, the core network device sends a second indication message to an access network device.

In embodiments of the disclosure, the contents of step S171 and step S172 can be referred to the relevant contents of above embodiments and will not be repeated here.

By implementing the method for realizing the paging cause indication according to embodiments of the disclosure, the indication of the paging cause may be realized, thereby avoiding the waste of paging resources and improving the paging efficiency.

In above embodiments of the disclosure, the methods according to embodiments of the disclosure are described from the perspectives of the terminal device, the core network device and the access network device, respectively. In order to realize each of the functions in the methods according to above embodiments of the disclosure, the terminal device, the core network device and the access network device may include a hardware structure, a software module, and realize each of the above functions in the form of hardware structure, software module, or a combination of hardware structure and software module. A certain function of the above functions may be performed in the form of hardware structure, software module, or a combination of hardware structure and software module.

Figure 18:
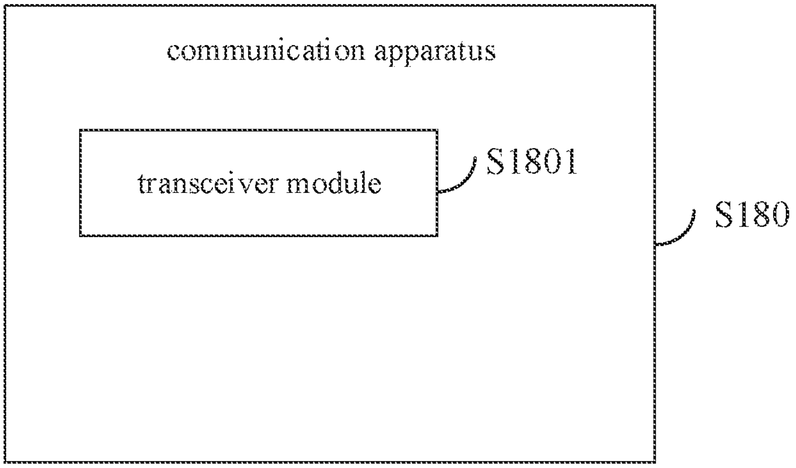
FIG. 18 is a schematic diagram illustrating a communication apparatus according to an embodiment of the disclosure.

FIG. 18 is a schematic diagram illustrating a communication apparatus 180 according to an embodiment of the disclosure. The communication apparatus 180 illustrated in FIG. 18 may include a transceiver module 1801. The transceiver module 1801 may include a transmitting module and/or a receiving module. The transmitting module is configured to perform a transmitting function, and the receiving module is configured to perform a receiving function, so that the transceiver module 1801 can perform the transmitting function and/or the receiving function.

The communication apparatus 180 may be a terminal device (such as the terminal device in above method embodiments), a device in the terminal device, or a device that can be used in combination with the terminal device. Or, the communication apparatus 180 may be a core network device, a device in the core network device, or a device that can be used in combination with the core network device. Or, the communication apparatus 180 may be an access network device, a device in the access network device, or a device that can be used in combination with the access network device.

The communication apparatus 180 is a terminal device (e.g., the terminal device in above method embodiments).

The transceiver module 1801 is configured to: send a first indication message to a core network device, in which the first indication message is used for indicating whether a terminal device supports the paging cause indication.

In some examples, the transceiver module 1801 is further configured to: receive a paging cause, in which the paging cause is sent by an access network device after determining, based on the first indication message, that the terminal device supports the paging cause indication.

In some examples, the transceiver module 1801 is further configured to: receive a second indication message sent by the core network device, in which the second indication message is used for indicating whether the core network device supports the paging cause indication.

In some examples, the second indication message is sent by the core network device after determining, based on the first indication message, that the terminal device supports the paging cause indication.

In some examples, the transceiver module 1801 is further configured to: receive the second indication message through a registration accept signaling in response to a network accessed by the terminal device being a NR network; or receive the second indication message through an attach accept signaling or a TAU accept signaling in response to the network accessed by the terminal device being an E-UTRAN.

In some examples, the transceiver module 1801 is further configured to: send a third indication message to the core network device in response to the terminal device no longer supporting the paging cause indication, in which the third indication message is used for indicating that the terminal device no longer supports the paging cause indication.

In some examples, the transceiver module 1801 is further configured to: determine, based on a network type of the network accessed by the terminal device, a target procedure for sending an indication message to the core network device; and report the indication message to the core network device based on the target procedure, in which the indication message is the first indication message or the third indication message.

In some examples, the transceiver module 1801 is further configured to: determine that the target procedure is one of: a registration procedure, a RAM procedure or a MRU procedure in response to the network accessed by the terminal device being the NR network; or determine that the target procedure is one of: an attach procedure or a TAU procedure in response to the network accessed by the terminal device being the E-UTRAN.

In some examples, the transceiver module 1801 is further configured to: report the indication message to the core network device through a registration request signaling in response to the accessed network being the NR network and the target procedure being the registration procedure, the RAM procedure or the MRU procedure.

In some examples, the transceiver module 1801 is further configured to: report the first indication message to the core network device through an attach request signaling in response to the accessed network being the E-UTRAN and the target procedure being the attach procedure; or report the first indication message to the core network device through a TAU request signaling in response to the accessed network being the E-UTRAN and the target procedure being the TAU procedure.

In some examples, the transceiver module 1801 is further configured to: report the third indication message to the core network device through a registration request signaling in response to the accessed network being the NR network and the target procedure being the registration procedure, the RAM procedure or the MRU procedure.

In some examples, the transceiver module 1801 is further configured to: report the third indication message to the core network device through an attach request signaling in response to the accessed network being the E-UTRAN and the target procedure being the attach procedure; or report the third indication message to the core network device through a TAU request signaling in response to the accessed network being the E-UTRAN and the target procedure being the TAU procedure.

The communication apparatus 180 is a core network device (e.g., the core network device mentioned in above method embodiments).

The transceiver module 1801 is configured to: determine that a terminal device supports the paging cause indication and send target indication information to an access network device, in which the target indication information is used for indicating that the terminal device supports the paging cause indication.

In some examples, the transceiver module 1801 is further configured to: receive a first indication message sent by the terminal device, in which the first indication message is used for indicating whether the terminal device supports the paging cause indication.

In some examples, the transceiver module 1801 is further configured to: send a second indication message to the terminal device and/or the access network device, in which the second indication message is used for indicating whether the core network device supports the paging cause indication.

In some examples, the transceiver module 1801 is further configured to: determine that the core network device supports the paging cause indication; or determine that both the terminal device and the core network device support the paging cause indication.

In some examples, the transceiver module 1801 is further configured to: send the second indication message to each access network device connected to the core network device; or send the second indication message to each access network device within a range of TA or RA where the terminal device is located; or send the second indication message to an access network device accessed by the terminal device.

In some examples, the transceiver module 1801 is further configured to: send a context configuration-related request of the terminal device to the access network device through an X2 interface or a NG interface, in which the context configuration-related request carries the target indication information.

In some examples, the transceiver module 1801 is further configured to: determine, based on a network type of a network accessed by the terminal device, a target interface for sending the second indication message, and send the second indication message to the access network device through the target interface.

In some examples, the transceiver module 1801 is further configured to: determine that the target interface is a NG interface in response to the accessed network being a NR network, and send first core network update configuration information to the access network device through the NG interface, in which the first core network update configuration information carries the second indication message; or determine that the target interface is a S1 interface in response to the accessed network being an E-UTRAN, and send second core network update configuration information to the access network device through the S1 interface, in which the second core network update configuration information carries the second indication message.

In some examples, the transceiver module 1801 is further configured to: receive a third indication message sent by the terminal device, in which the third indication message is used for indicating that the terminal device no longer supports the paging cause indication.

The communication apparatus 180 is an access network device (e.g., the access network device mentioned in above method embodiments).

The transceiver module 1801 is configured to: receive target indication information sent by a core network device, in which the target indication information is used for indicating whether a terminal device supports the paging cause indication; and send a paging cause to the terminal device in response to paging the terminal device and the target indication information indicating that the terminal device supports the paging cause indication.

In some examples, the transceiver module 1801 is further configured to: determine a RRC status of the terminal device, and send the paging cause to the terminal device based on the RRC status.

In some examples, the transceiver module 1801 is further configured to: send the paging cause in a RAN paging message in response to the RRC status being a RRC inactive status; or send the paging cause in a paging message in response to the RRC status being a RRC idle status.

In some examples, the transceiver module 1801 is further configured to: store the target indication information in a context of the terminal device; and query the target indication information from the context in response to paging the terminal device.

In some examples, the transceiver module 1801 is further configured to: receive a second indication message sent by the core network device, in which the second indication message is used for indicating whether the core network device supports the paging cause indication.

With the apparatus for realizing the paging cause indication according to embodiments of the disclosure, the indication of the paging cause may be realized, thereby avoiding the waste of paging resources and improving the paging efficiency.

Figure 19:
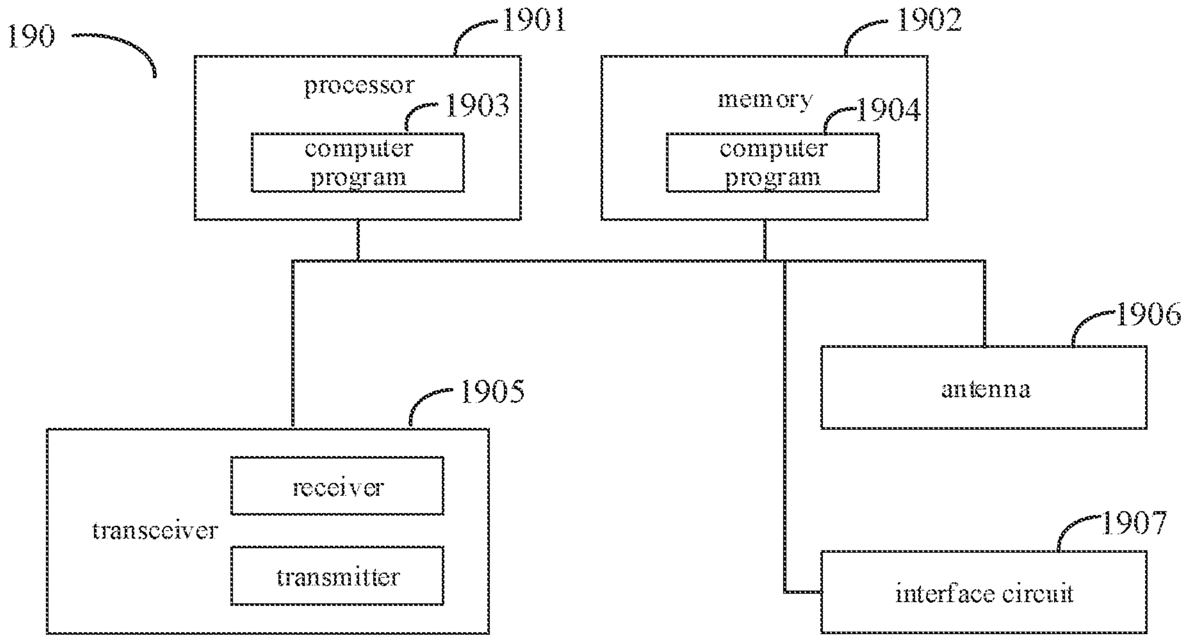
FIG. 19 is a schematic diagram illustrating a communication device according to an embodiment of the disclosure.

FIG. 19 is a schematic diagram illustrating a communication device 190 according to an embodiment of the disclosure. The communication device 190 may be a network device or a terminal device (e.g., the terminal device mentioned in above method embodiments), or may be a chip, a chip system or a processor that supports the network device to realize the above-described methods, or may be a chip, a chip system or a processor that supports the terminal device to realize the above-described methods. The device may be used to realize the methods described in above method embodiments with reference to the description of above-described method embodiments.

The communication device 190 may include one or more processors 1901. The processor 1901 may be a general purpose processor or a dedicated processor, such as, a baseband processor and a central processor. The baseband processor is used for processing communication protocols and communication data. The central processor is used for controlling the communication device (e.g., a base station, a baseband chip, a terminal device, a terminal device chip, a DU, or a CU), executing computer programs, and processing data of the computer programs.

In some examples, the communication device 190 may include one or more memories 1902 on which computer programs 1904 may be stored. The processor 1901 executes the computer programs 1904 to cause the communication device 190 to perform the methods described in the above method embodiments. In some examples, the memory 1902 may also store data. The communication device 190 and the memory 1902 may be provided separately or may be integrated together.

In some examples, the communication device 190 may also include a transceiver 1905 and an antenna 1906. The transceiver 1905 may be referred to as a transceiver unit, a transceiver machine, or a transceiver circuit, for realizing a transceiver function. The transceiver 1905 may include a receiver and a transmitter. The receiver may be referred to as a receiving machine or a receiving circuit, for realizing the receiving function. The transmitter may be referred to as a transmitter machine or a transmitting circuit, for realizing the transmitting function.

In some examples, the communication device 190 may also include one or more interface circuits 1907. The interface circuits 1907 are used to receive code instructions and transmit them to the processor 1901. The code instructions runs on the processor 1901 to cause the communication device 190 to perform the method described in the method embodiments.

The communication device 190 is a terminal device (e.g., the terminal device in the above method embodiments). The transceiver 1905 is used to perform step S21 in FIG. 2, steps S31 and S32 in FIG. 3, steps S41, S42 and S43 in FIG. 4, step S51 in FIG. 5, steps S61, S62 and S63 in FIG. 6, and step S71 in FIG. 7.

The communication device 190 is a network device. When the network device is a core network device, the transceiver 1905 is used to perform step S81 in FIG. 8, step S91 and step S92 in FIG. 9, step S101, step S102 and step S103 in FIG. 10, step S111 in FIG. 11, and step S121 in FIG. 12. When the network device is an access network device, the transceiver 1905 is used to perform step S151 and step S152 in FIG. 15, step S161, step S162 and step S163 in FIG. 16, and step S171 and step S172 in FIG. 17.

In an implementation, the processor 1901 may include a transceiver for implementing the receiving and sending functions. The transceiver may be, for example, a transceiver circuit, an interface, or an interface circuit. The transceiver circuit, the interface, or the interface circuit for implementing the receiving and sending functions may be separated or may be integrated together. The transceiver circuit, the interface, or the interface circuit described above may be used for reading and writing code/data, or may be used for signal transmission or delivery.

In an implementation, the processor 1901 may store a computer program 1903. When the computer program 1903 runs on the processor 1901, the communication device 190 is caused to perform the methods described in the method embodiments above. The computer program 1903 may be solidified in the processor 1901, and in such case the processor 1901 may be implemented by hardware.

In an implementation, the communication device 190 may include circuits. The circuits may implement the sending, receiving or communicating function in the preceding method embodiments. The processor and the transceiver described in this disclosure may be implemented on integrated circuits (ICs), analog ICs, radio frequency integrated circuits (RFICs), mixed signal ICs, application specific integrated circuits (ASICs), printed circuit boards (PCBs), and electronic devices. The processor and the transceiver can also be produced using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon-germanium (SiGe), gallium arsenide (GaAs) and so on.

The communication device in the description of above embodiments may be a network device or a terminal device (e.g., the terminal device in the preceding method embodiments), but the scope of the communication device described in the disclosure is not limited thereto, and the structure of the communication device may not be limited by FIG. 14. The communication device may be a stand-alone device or may be part of a larger device. For example, the described communication device may be:

(1) a stand-alone IC, a chip, a chip system or a subsystem;
(2) a collection of ICs including one or more ICs. In some examples, the collection of ICs may also include storage components for storing data and computer programs;
(3) an ASIC, such as a modem;
(4) a module that can be embedded within other devices;
(5) a receiver, a terminal device, a smart terminal device, a cellular phone, a wireless device, a handheld machine, a mobile unit, an in-vehicle device, a network device, a cloud device, an artificial intelligence device, and the like; and
(6) others.

Figure 20:
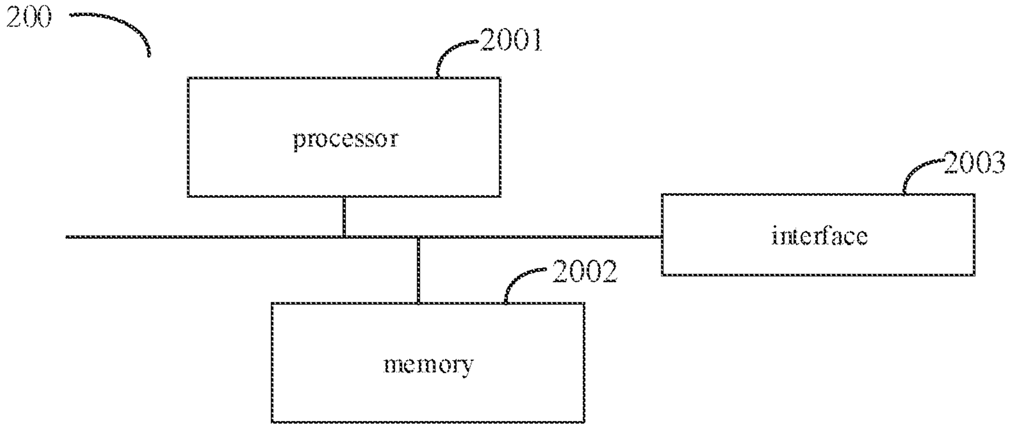
FIG. 20 is a schematic diagram illustrating a chip according to an embodiment of the disclosure.

The case where the communication device may be a chip or a chip system is described with reference to the schematic structure of the chip shown in FIG. 20. The chip shown in FIG. 20 includes a processor 2001 and an interface 2002. There may be one or more processors 2001, and there may be multiple interfaces 2002.

In cases where the chip is used to implement the function of the terminal device (e.g., the terminal device in the preceding method embodiments) in the embodiment of the disclosure:

the interface 2002 is used for performing step S21 in FIG. 2, step S31 and step S32 in FIG. 3, step S41, step S42 and step S43 in FIG. 4, step S51 in FIG. 5, step S61, step S62 and step S63 in FIG. 6, and step S71 in FIG. 7.

In cases where the chip is used to implement the function of the network device in the embodiment of the disclosure:

when the network device is a core network device, the interface 2002 is used to perform step S81 in FIG. 8, step S91 and step S92 in FIG. 9, step S101, step S102 and step S103 in FIG. 10, step S111 in FIG. 11, and step S121 in FIG. 12.

When the network device is an access network device, the interface 2002 is used to perform step S151 and step S152 of FIG. 15, step S161, step S162 and step S163 of FIG. 16, and step S171, and step S172 of FIG. 17.

In some examples, the chip further includes a memory 2003 used to store necessary computer programs and data.

It is understood by those skilled in the art that various illustrative logical blocks and steps listed in embodiments of the disclosure may be implemented by electronic hardware, computer software, or a combination of both. Whether such function is implemented by hardware or software depends on the particular application and the design requirements of the entire system. Those skilled in the art may, for each particular application, use various methods to implement the described function, but such implementation should not be understood as beyond the scope of protection of embodiments of the disclosure.

Embodiments of the disclosure also provide a system for realizing a paging cause indication. The system includes a communication device acting as a terminal device (e.g., the terminal device in the preceding method embodiments) and a communication device acting as a network device in the aforementioned embodiment of FIG. 18. Or, it includes a communication device acting as a terminal device (e.g., the terminal device in the preceding method embodiments) and a communication device acting as a network device in the aforementioned embodiment of FIG. 19.

The disclosure also provides a readable storage medium having instructions stored thereon. When the instructions are executed by a computer, the function of any of the method embodiments described above is implemented.

The disclosure also provides a computer program product. When the computer program product is executed by a computer, the function of any of the method embodiments described above is implemented.

Above embodiments may be implemented in whole or in part by software, hardware, firmware, or any combination thereof. When implemented using software, above embodiments may be implemented, in whole or in part, in the form of a computer program product. The computer program product includes one or more computer programs. When loading and executing the computer program on the computer, all or part of processes or functions described in embodiments of the disclosure is implemented. The computer may be a general-purpose computer, a dedicated computer, a computer network, or other programmable devices. The computer program may be stored in a computer-readable storage medium or transmitted from one computer-readable storage medium to another computer-readable storage medium. For example, the computer program may be transmitted from one web site, computer, server, or data center to another web site, computer, server, or data center, in a wired manner (e.g., using coaxial cables, fiber optics, or digital subscriber lines (DSLs) or wireless manner (e.g., using infrared wave, wireless wave, or microwave). The computer-readable storage medium may be any usable medium to which the computer is capable to access or a data storage device such as a server integrated by one or more usable mediums and a data center. The usable medium may be a magnetic medium (e.g., a floppy disk, a hard disk, and a tape), an optical medium (e.g., a high-density digital video disc (DVD)), or a semiconductor medium (e.g., a solid state disk (SSD)).

Those skilled in the art can understand that the first, second, and other various numerical numbers involved in the disclosure are only described for the convenience of differentiation, and are not used to limit the scope of embodiments of the disclosure, or used to indicate the order of precedence.

The term "at least one" in the disclosure may also be described as one or more, and the term "multiple" may be two, three, four, or more, which is not limited in the disclosure. In embodiments of the disclosure, for a type of technical features, "first", "second", and "third", and "A", "B", "C" and "D" are used to distinguish different technical features of the type, the technical features described using the "first", "second", and "third", and "A", "B", "C" and "D" do not indicate any order of precedence or magnitude.

The correspondences shown in the tables in this disclosure may be configured or may be predefined. The values of information in the tables are merely examples and may be configured to other values, which are not limited by the disclosure. In configuring the correspondence between the information and the parameter, it is not necessarily required that all the correspondences illustrated in the tables must be configured. For example, the correspondences illustrated in certain rows in the tables in this disclosure may not be configured. For another example, the above tables may be adjusted appropriately, such as splitting, combining, and the like. The names of the parameters shown in the titles of the above tables may be other names that can be understood by the communication device, and the values or representations of the parameters may be other values or representations that can be understood by the communication device. Each of the above tables may also be implemented with other data structures, such as, arrays, queues, containers, stacks, linear tables, pointers, chained lists, trees, graphs, structures, classes, heaps, and Hash tables.

The term "predefine" in this disclosure may be understood as define, define in advance, store, pre-store, pre-negotiate, pre-configure, solidify, or pre-fire.

Those skilled in the art may realize that the units and algorithmic steps of the various examples described in combination with embodiments disclosed herein are capable of being implemented in the form of electronic hardware, or a combination of computer software and electronic hardware. Whether these functions are performed in the form of hardware or software depends on the specific application and design constraints of the technical solution. Those skilled in the art may use different methods to implement the described functions for each particular application, but such implementations should not be considered as beyond the scope of the disclosure.

It is clearly understood by those skilled in the field to which it belongs that, for the convenience and brevity of description, the specific working processes of the systems, apparatuses, and units described above can be referred to the corresponding processes in the preceding method embodiments, and will not be repeated herein.

The above are only specific implementations of the disclosure, but the scope of protection of the disclosure is not limited thereto. Those skilled in the art familiar to this technical field can easily think of changes or substitutions in the technical scope disclosed by the disclosure, which shall be covered by the scope of protection of the disclosure. Therefore, the scope of protection of the disclosure shall be governed by the scope of protection of the appended claims.

What is claimed is:

1. A method for realizing a paging cause indication, performed by a terminal device, comprising:

sending a first indication message to a core network device, wherein the first indication message is used for indicating whether the terminal device supports the paging cause indication;

receiving a paging cause, wherein the paging cause is sent by an access network device after determining, based on the first indication message, that the terminal device supports the paging cause indication;

sending a third indication message to the core network device in response to the terminal device no longer supporting the paging cause indication, wherein the third indication message is used for indicating that the terminal device no longer supports the paging cause indication;

wherein sending the first indication message or the third indication message to the core network device comprises:

determining, based on a network type of a network accessed by the terminal device, a target procedure for sending an indication message to the core network device; and reporting the indication message to the core network device based on the target procedure.

2. The method of claim 1, further comprising at least one of:

receiving a second indication message sent by the core network device, wherein the second indication message is used for indicating whether the core network device supports the paging cause indication.

3. The method of claim 1, wherein reporting the indication message to the core network device based on the target procedure comprises:

reporting the third indication message to the core network device through an attach request signaling in response to the accessed network being an Evolution Universal Mobile Telecommunications System Terrestrial Radio Access Network (E-UTRAN) and the target procedure being an attach procedure; or reporting the third indication message to the core network device through a tracking area update (TAU) request signaling in response to the accessed network being the E-UTRAN and the target procedure being a TAU procedure.

4. The method of claim 2, wherein the second indication message is sent by the core network device after determining, based on the first indication message, that the terminal device supports the paging cause indication.

5. The method of claim 2, wherein receiving the second indication message sent by the core network device comprises:

receiving the second indication message through a registration accept signaling in response to a network accessed by the terminal device being a new radio (NR) network; or receiving the second indication message through an attach accept signaling or a tracking area update (TAU) accept signaling in response to the network accessed by the terminal device being an Evolution Universal Mobile Telecommunications System Terrestrial Radio Access Network (E-UTRAN).

6. The method of claim 1, wherein reporting the indication message to the core network device based on the target procedure comprises:

reporting the first indication message to the core network device through an attach request signaling in response to the accessed network being an Evolution Universal Mobile Telecommunications System Terrestrial Radio Access Network (E-UTRAN) and the target procedure being an attach procedure; or reporting the first indication message to the core network device through a tracking area update (TAU) request signaling in response to the accessed network being the E-UTRAN and the target procedure being a TAU procedure.

7. The method of claim 1, wherein reporting the indication message to the core network device based on the target procedure comprises:

reporting the third indication message to the core network device through a registration request signaling in response to the accessed network being a new radio (NR) network and the target procedure being a registration procedure, a registration area management (RAM) procedure or a mobile registration update (MRU) procedure.

8. The method of claim 1, wherein determining, based on the network type of the network accessed by the terminal device, the target procedure for sending the indication message to the core network device comprises:

determining that the target procedure is one of: a registration procedure, a registration area management (RAM) procedure or a mobile registration update (MRU) procedure in response to the network accessed by the terminal device being a new radio (NR) network; or determining that the target procedure is one of: an attach procedure or a tracking area update (TAU) procedure in response to the network accessed by the terminal device being an Evolution Universal Mobile Telecommunications System Terrestrial Radio Access Network (E-UTRAN).

9. The method of claim 1, wherein reporting the indication message to the core network device based on the target procedure comprises:

reporting the first indication message to the core network device through a registration request signaling in response to the accessed network being a new radio (NR) network and the target procedure being a registration procedure, a registration area management (RAM) procedure or a mobile registration update (MRU) procedure.

10. A method for realizing a paging cause indication, performed by a core network device, comprising:

determining that a terminal device supports the paging cause indication and sending target indication information to an access network device, wherein the target indication information is used for indicating that the terminal device supports the paging cause indication;

receiving a first indication message sent, based on a target procedure, by the terminal device, wherein the first indication message is used for indicating whether the terminal device supports the paging cause indication;

receiving a third indication message sent, based on the target procedure, by the terminal device, wherein the third indication message is used for indicating that the terminal device no longer supports the paging cause indication;

wherein the target procedure is determined based on a network type of a network accessed by the terminal device.

11. The method of claim 10, further comprising at least one of:

sending a second indication message to at least one of the terminal device or the access network device, wherein the second indication message is used for indicating whether the core network device supports the paging cause indication.

12. The method of claim 11, further comprising:

determining that the core network device supports the paging cause indication; or determining that both the terminal device and the core network device support the paging cause indication.

13. The method of claim 11, wherein sending the second indication message to the access network device comprises:

sending the second indication message to each access network device connected to the core network device;

sending the second indication message to each access network device within a range of tracking area (TA) or registration area (RA) where the terminal device is located; or sending the second indication message to an access network device accessed by the terminal device.

14. The method of claim 11, wherein sending the second indication message to the access network device comprises:

determining, based on a network type of a network accessed by the terminal device, a target interface for sending the second indication message, and sending the second indication message to the access network device through the target interface.

15. The method of claim 14, wherein determining, based on the network type of the network accessed by the terminal device, the target interface for sending the second indication message and sending the second indication message to the access network device through the target interface comprises:

determining that the target interface is a NG interface in response to the accessed network being a new radio (NR) network and sending first core network update configuration information to the access network device through the NG interface, wherein the first core network update configuration information carries the second indication message; or determining that the target interface is a S1 interface in response to the accessed network being an Evolution Universal Mobile Telecommunications System Terrestrial Radio Access Network (E-UTRAN) and sending second core network update configuration information to the access network device through the S1 interface, wherein the second core network update configuration information carries the second indication message.

16. The method of claim 10, wherein sending the target indication information to the access network device comprises:

sending a context configuration-related request of the terminal device to the access network device through an X2 interface or a NG interface, wherein the context configuration-related request carries the target indication information.

17. A method for realizing a paging cause indication, performed by an access network device, comprising:

receiving target indication information sent by a core network device, wherein the target indication information is used for indicating whether a terminal device supports the paging cause indication; and sending a paging cause to the terminal device in response to the terminal device being paged and the target indication information indicating that the terminal device supports the paging cause indication, wherein the target indication information is sent by the terminal device to the core network device based on a target procedure, and the target procedure is determined based on a network type of a network accessed by the terminal device.

18. The method of claim 17, wherein sending the paging cause to the terminal device comprises:

determining a radio resource control (RRC) status of the terminal device, and sending the paging cause to the terminal device based on the RRC status.

19. The method of claim 18, wherein sending the paging cause to the terminal device based on the RRC status comprises:

sending the paging cause in a radio access network (RAN) paging message in response to the RRC status being a RRC inactive status; or sending the paging cause in a paging message in response to the RRC status being a RRC idle status.

20. The method of claim 17, further comprising at least one of:

storing the target indication information in a context of the terminal device; and querying the target indication information from the context in response to the terminal device being paged; or receiving a second indication message sent by the core network device, wherein the second indication message is used for indicating whether the core network device supports the paging cause indication.

* * * * *